US008828487B2

(12) United States Patent
Todt et al.

(10) Patent No.: US 8,828,487 B2
(45) Date of Patent: Sep. 9, 2014

(54) VAPOR PERMEABLE FABRIC CONSTRUCTS

(75) Inventors: Gregory L. Todt, Union, MI (US);
Seckin Ozol, South Bend, IN (US);
Rajesh Hemendra Shah, Lexington, MA (US)

(73) Assignee: Transhield Technology AS (NO)

( * ) Notice: Subject to any disclaimer, the term of this patent is extended or adjusted under 35 U.S.C. 154(b) by 710 days.

(21) Appl. No.: 12/875,870

(22) Filed: Sep. 3, 2010

(65) Prior Publication Data

US 2012/0058294 A1  Mar. 8, 2012

(51) Int. Cl.
| | |
|---|---|
| B32B 37/24 | (2006.01) |
| B32B 37/12 | (2006.01) |
| B32B 37/02 | (2006.01) |
| B05D 1/14 | (2006.01) |
| B05D 1/04 | (2006.01) |
| B32B 5/02 | (2006.01) |
| B32B 5/06 | (2006.01) |
| B32B 5/12 | (2006.01) |
| B32B 27/30 | (2006.01) |
| B32B 27/12 | (2006.01) |
| B32B 33/00 | (2006.01) |
| B32B 7/12 | (2006.01) |
| B32B 5/26 | (2006.01) |
| B32B 27/34 | (2006.01) |
| B32B 5/08 | (2006.01) |
| B32B 27/28 | (2006.01) |

(52) U.S. Cl.
CPC ............... *B32B 33/00* (2013.01); *B32B 5/022* (2013.01); *B32B 2255/26* (2013.01); *B32B 2262/062* (2013.01); *B32B 2262/14* (2013.01); *B32B 5/06* (2013.01); *B32B 2307/724* (2013.01); *B32B 2305/18* (2013.01); *B32B 2262/0261* (2013.01); *B32B 5/12* (2013.01); *B32B 2307/7265* (2013.01); *B32B 2307/7145* (2013.01); *B32B 27/308* (2013.01); *B32B 2307/21* (2013.01); *B32B 2262/0276* (2013.01); *B32B 2459/00* (2013.01); *B32B 2553/00* (2013.01); *B32B 27/12* (2013.01); *B32B 2307/752* (2013.01); *B32B 2571/00* (2013.01); *B32B 7/12* (2013.01); *B32B 2307/712* (2013.01); *B32B 2255/02* (2013.01); *B32B 5/26* (2013.01); *B32B 37/12* (2013.01); *B32B 2305/026* (2013.01); *B32B 2307/3065* (2013.01); *B32B 27/34* (2013.01); *B32B 2255/28* (2013.01); *B32B 2307/738* (2013.01); *B32B 5/028* (2013.01); *B32B 5/08* (2013.01); *B32B 27/285* (2013.01)
USPC ........... 427/206; 427/209; 427/202; 427/463; 427/465; 428/90; 428/212

(58) Field of Classification Search
USPC ......... 428/90, 212; 442/76, 86; 427/462, 463, 427/465, 180, 202, 206, 209
See application file for complete search history.

(56) References Cited

U.S. PATENT DOCUMENTS

| | | |
|---|---|---|
| 2,675,330 A | 4/1954 | Schwartz et al. |
| 4,233,027 A | 11/1980 | Albero |

(Continued)

FOREIGN PATENT DOCUMENTS

WO     2010022066 A2    2/2010

OTHER PUBLICATIONS

Corresponding international application Search Report & Written Opinion dated Apr. 18, 2012.

*Primary Examiner* — Cheryl Juska
(74) *Attorney, Agent, or Firm* — Faegre Baker Daniels LLP

(57) ABSTRACT

This invention relates to protective, multi-layered, breathable fabric constructs. The constructs which are flexible employ a fabric layer and a breathable coating layer applied to the fabric. Under certain preferred embodiments, the fabric constructs also employ an energy dissipating fiber material disposed opposite the coating layer. Also, the present invention teaches a method of protecting a valuable or sensitive object from damage caused by corrosion, weather, bio mass, or other environmental related conditions using the fabric material. The fabric constructs may be post-formed using heat or other methods to create shaped-to-form covers.

19 Claims, 5 Drawing Sheets

(56) References Cited

U.S. PATENT DOCUMENTS

| | | |
|---|---|---|
| 4,459,332 A | 7/1984 | Giglia |
| 5,543,195 A | 8/1996 | Squires et al. |
| 5,863,633 A | 1/1999 | Squires et al. |
| 6,045,900 A | 4/2000 | Haffner et al. |
| 2001/0008672 A1* | 7/2001 | Norvell et al. .................. 428/90 |
| 2004/0176009 A1 | 9/2004 | Hatta et al. |
| 2005/0176331 A1 | 8/2005 | Martin et al. |
| 2008/0011034 A1* | 1/2008 | Hochrein et al. ................... 71/9 |
| 2008/0176468 A1 | 7/2008 | Chen |
| 2010/0003486 A1* | 1/2010 | Lalgudi et al. ................ 428/220 |
| 2012/0015161 A1* | 1/2012 | Todt et al. ..................... 428/198 |

\* cited by examiner

VAPOR PERMEABLE FABRIC CONSTRUCTS

INTRODUCTION

Protecting valuable military and aerospace assets, such as military ground vehicles, weapon systems and other equipment on naval ships and support equipment at airfields from corrosion, mold and mildew is a highly important task for the armed services. Equipment being used in the field has to be ready for use at all times. This need for readiness requires armed forces to spend a tremendous amount of money, time and manpower on the upkeep of equipment.

Common methods to protect these assets vary from shelters with controlled environments to shrink wrap films to heavy-duty-tarps. However all of these methods tend to have a shortcoming for day-to-day use and protection of this valuable equipment. Shelters cannot be built at all locations and they require a lot of capital to build. Shrink wrapping this kind of equipment with shrink film might provide protection for short periods of time, however most shrink film create a barrier where condensation cannot escape over time, thus creating a corrosive environment inside the wrap. Heavy duty covers, such as tarps, can be used on smaller items, however when it comes to larger equipment such as ground equipment or tanks, they add too much weight, eliminating ease of handling—taking away readiness.

One main issue with armored military vehicles such as Bradley or Abram Tanks is that their surface is made up of complex materials such as "Chobham Armour". Chobham Armour often uses a mixture of several ceramic material or metal matrix composites that combine metals, plastics and ceramic. Materials most often used on armor production include boron carbide, silicon carbide, aluminum oxide, aluminum nitride, titanium boride and synthetic diamond composite. By using these materials, armor manufacturers focus on creating the hardest possible surfaces at lightest weight. However, these hard surfaces most often work against a cover that is designed to protect the tank against environmental hazards, such as corrosion. The process of dragging a cover over a tank's armored surface eventually weakens most fabric and shortens the lifecycle of that cover.

Oil and gas exploration and pipeline industries also have problems with environmental corrosion. According to NACE International corrosion is one of the leading causes of storage tank and piping failures. Corrosion related costs for transmission pipelines estimated at $7 billion annually in the U.S. alone and another $5 billion for gas distribution. Protective covers are being used to prevent corrosion on flanges, valves and welded joints. A light weight post-formable fabric with high water vapor transmission rate can help prevent corrosion due to condensation and other environmental elements.

Automobiles and motorcycles also need covers for transport or storage in order to protect against paint damage and corrosion. As these vehicles get transported, it is important to provide sufficient protection against weather elements and possible road hazards such as stones.

Airport ground-support equipment, such as fueling vehicles need protection from environmental hazards as well. However this equipment and what can be used as a cover are highly regulated by aviation rules, due to fire hazard that can be caused by static electricity discharge.

Therefore, there is a need for a fabric construct that combines breathability, flexibility and durability against rough surfaces being covered, yet provide a soft-touch to a sensitive finished surface and that can be converted into protective covers for everyday use.

SUMMARY OF INVENTION

The fabric constructs of the present invention include at a minimum a porous fabric and breathable polymer coating applied to the porous fabric layer, where the end product yields a fabric composite that is water proof, flexible and breathable. The construct has a preferred water vapor transmission rate of at least 100 grams/sq meter/day. Under certain embodiments, the fabric construct will also include a flocked layer applied to the porous fabric layer on the side opposite the breathable polymer coating. The flocked layer employs a combination of materials, size spacing and application parameters to create an energy dissipating fiber network which is resilient yet soft to the touch. Covers formed from the fabric constructs of the present invention by either custom sewing or thermoforming to a certain shape by use of a mold by way of non-limiting example are highly effective in use.

When flocking is present, it is generally used in association with an adhesive package to assist in retaining the flocking on the host porous fabric. The adhesive may be modified to be hydrophilic by use of titanates and/or zirconates that are hydrophilic. The hydrophilic nature of the adhesive helps to concentrate the water molecules closer to highly permeable polymer layer. Also, the adhesive can be used as a carrier for a vapor corrosion inhibitor chemistry so that the fabric construct can be turned into corrosion preventative covers for military vehicles and equipment, aerospace parts and equipment, automobiles, boats, oil and pipeline equipment and other high value items that needs protection from environmental hazards such as corrosion, mold and mildew. Preferably the adhesive is a foamed adhesive.

Covers made from the fabric constructs described herein will provide protection from the environment similar to a tarp or shrink wrap film, but also provide a controlled microenvironment by means of high rates of breathability (100 grams/day/sq meter or higher) to retard corrosion especially working in synergy with vapor corrosion inhibitors (VCI's).

DETAILED DESCRIPTION OF THE INVENTION

Figure 1:
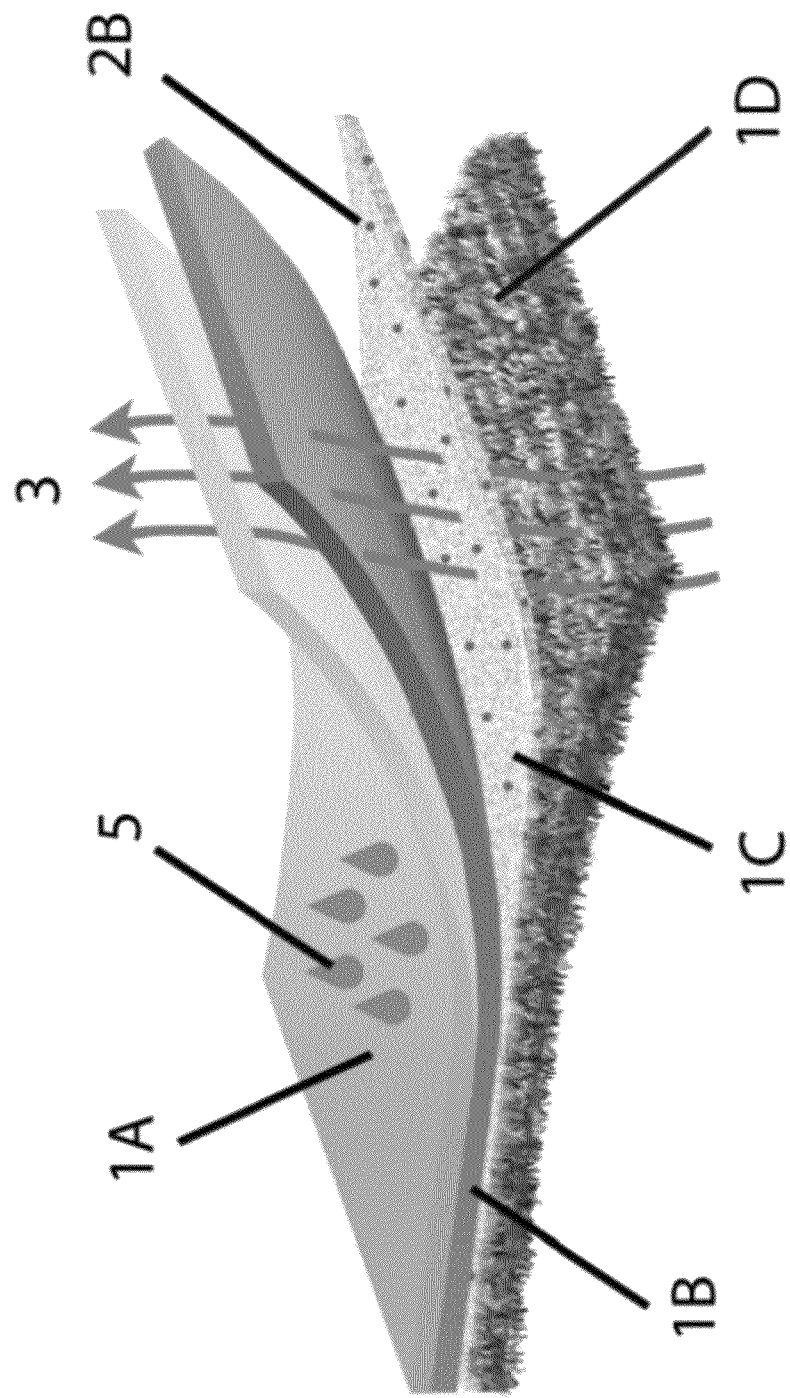
FIG. 1 is a partially separated perspective view showing the different layers that make up the fabric construct of the present invention.

The present invention relates to a new fabric construct including a porous fabric layer and at least one of a flocked fiber layer and a vapor permeable polymer composition applied to the porous fabric layer. In many applications, the flocked fiber and the vapor permeable polymer composition are employed on opposite sides of the porous fabric layer. It is understood that references to vapor and the like refer to water vapor, i.e. water in the gaseous state.

In one embodiment, a fabric construct according to the invention is made of a porous fabric layer, an adhesive layer applied to the fabric layer, and a layer of flocked fibers applied to the adhesive layer. Further, there is a substantially waterproof, vapor permeable polymer composition applied to the porous fabric on the side opposite the flocked fibers. In various embodiments, the porous fabric is a non-woven, a woven, or a combination of a woven and non-woven fabric. In various embodiments, the adhesive layer is selected from acrylic latexes, urethanes, and epoxies. In preferred embodiments, the adhesive is hydrophilic and can contain hydrophilic making additives selected from titanates and zirconates, especially hydrophilic titanates and zirconates. The adhesive layer can further contain one or more additives selected from vapor corrosion inhibitors, anti-static agents, antimicrobials, biostatics, and fire resistant additives. In preferred embodiments, the adhesive layer is foamed.

In further aspects of this embodiment, the flocked fibers are formed of one or more materials selected from the group consisting of natural and synthetic fibers. In various embodiments, the flocked fibers are characterized by an average denier of between 0.5 and 90.0 and/or an average length between 10 mils and 380 mils. The flocked fibers are capable of wicking moisture in the direction of the fabric layer to which they are attached. In various embodiments, the substantially waterproof, moisture vapor permeable coating is made of a polyamide/polyether block co-polymer, or is made of a material that comprises a fatty acid modified ionomer at least partially neutralized with potassium or sodium. In a preferred embodiment, the vapor permeable polymeric composition comprises a potassium salt of a fatty acid and an ionomer comprising a plurality of carboxylate groups, at least some of which are modified by a potassium ion. The vapor permeable polymeric composition preferably forms a top layer of the construct having an average thickness of 0.5 mil to 10 mils. The vapor permeable polymeric composition forms a top layer having a high water vapor transmission rate. In a preferred embodiment, the water vapor transmission rate of the vapor permeable polymeric composition is at least 100 grams/square meter/day at 37.8 degrees Celsius and 100% relative humidity. The coating containing the permeable polymeric composition is normally rate limiting as to vapor permeability of the construct of which it is a part, such that the same levels of water vapor transmission obtain for the construct as a whole.

In one embodiment, the porous fabric layer is made of a stitch reinforced two-stage non-woven fabric having a first side characterized by fibers of a first hydrophilicity and a second side characterized by fibers of a second hydrophilicity different from that of the fibers of the first side.

In another embodiment, a method of manufacturing a cover material that is substantially waterproof and permeable to moisture vapor involves the steps of providing a porous fabric layer and applying an adhesive to the fabric layer. Thereafter, flocked fibers are applied to the adhesive layer, and then a substantially waterproof, moisture vapor permeable polymeric top layer is applied to the porous fabric on the side opposite the adhesive and the flocked fibers. In various embodiments, the adhesive is applied to the porous fabric by spray coating, knife coating, curtain coating, reverse roll coating, gravure coating, rotary screen coating, and the like. The adhesive in various embodiments includes vapor corrosion inhibitors (VCI), anti-static agents, antibacterial and biostatic additives, and/or fire resistant additives. The flocked fibers are applied electrostatically and mechanically to the adhesive. The flocked fibers are chosen from materials that are capable of surviving the conditions of any further manufacturing steps taken after they are flocked. In non-limiting examples, the flocked fibers are selected from rayon, acetate, nylon, polyolefin, acrylic, polyester, carbon fiber, cotton, hemp, and wool fibers.

In another embodiment, a fabric construct is provided that comprises a stitch reinforced two-stage non-woven entangled fabric having a water vapor permeable polymeric composition applied on a major surface of the non-woven fabric. The two-stage non-woven entangled fabric has a first major surface characterized by having fibers of a first hydrophilicity and a second major surface characterized by having fibers characterized by a second hydrophilicity. The hydrophilicity of the fibers on the second major surface is greater than the hydrophilicity of fibers on the first major surface. Finally, the vapor permeable polymeric composition is in contact with the second major surface of the fabric, i.e., the surface characterized by fibers of greater hydrophilicity.

In various embodiments, the non-woven fabric used in the fiber construct is prepared by carding a layer of fibers having a first hydrophilicity, placing a stitch knit fabric on the carded layer, and applying onto the stitch knit fabric a second card of fibers having a second hydrophilicity. The hydrophilicities of the first and second card are different. After applying the two cards with the interposed stitch knit fabric, the fibers of the non-woven fabric are entangled, such as by hydroentangling or needle punching.

In this embodiment, the non-woven fabric is covered on one side by a water vapor permeable polymeric composition as described herein. In preferred embodiments, this permeable polymeric composition includes a fatty acid modified ionomer composition partially neutralized by sodium or potassium. Alternatively, the vapor permeable polymeric composition includes a polyamide/polyether block co-polymer or other polymeric composition providing suitable vapor permeability.

In another embodiment, covers are formed from the vapor permeable, coated, flocked constructs. Depending on the nature of the object to be protected by the cover, the construct and the cover can be provided with different vapor permeabilities at different locations. In this embodiment, where the vapor permeability in a particular area of the cover is less than other areas or is essentially zero, water vapor will tend to migrate to areas of the cover with greater permeability where it can escape.

Referring to FIG. 1, the top layer is a water proof highly breathable (i.e. water vapor permeable or moisture vapor permeable) polymer composition (1A). Under 1A, there is a porous fabric with high tear and physical properties, yet low weight (1B). 1B can be a woven, nonwoven or a combination thereof. Porous fabric (1B) is coated by an adhesive layer (1C), where the adhesive may contain titanates and vapor corrosion inhibitors (2B) and other additives to enhance the properties of the fabric construct. Adhesive (1C) also locks the flock fibers (1D) in place, perpendicular to the fabric surface (1B). The fabric construct (1) is water proof keeping liquid water (5) outside, while allowing water vapor (3) to be pushed out in order to provide a modified environment to prevent corrosion.

While not shown in FIG. 1, the porous fabric can be coated with another layer of adhesive on the opposite side of the flocked fiber and then laminated to a highly permeable polymer film.

In a more specific and preferred embodiment, the fabric construct of the present invention comprises a porous fabric in the middle. The construct is manufactured by first coating one side of the porous fabric with a pre-coat adhesive. Then a second coat of adhesive is applied on top of the pre-coat adhesive and flock-grade fibers are applied in a flocking operation. The fibers are applied by electrostatic and mechanical forces where they are exposed to certain amount of charge that keeps the fibers substantially perpendicular to the adhesive coated surface. Following the addition of fibers to adhesive layer, the adhesive is cured in order to lock the standing fibers in place. Thereafter, the flocked porous fabric preform is extrusion coated on the side opposite the flocked fibers with a breathable polymer composition that is designed to service outdoor environments.

Figure 2A:
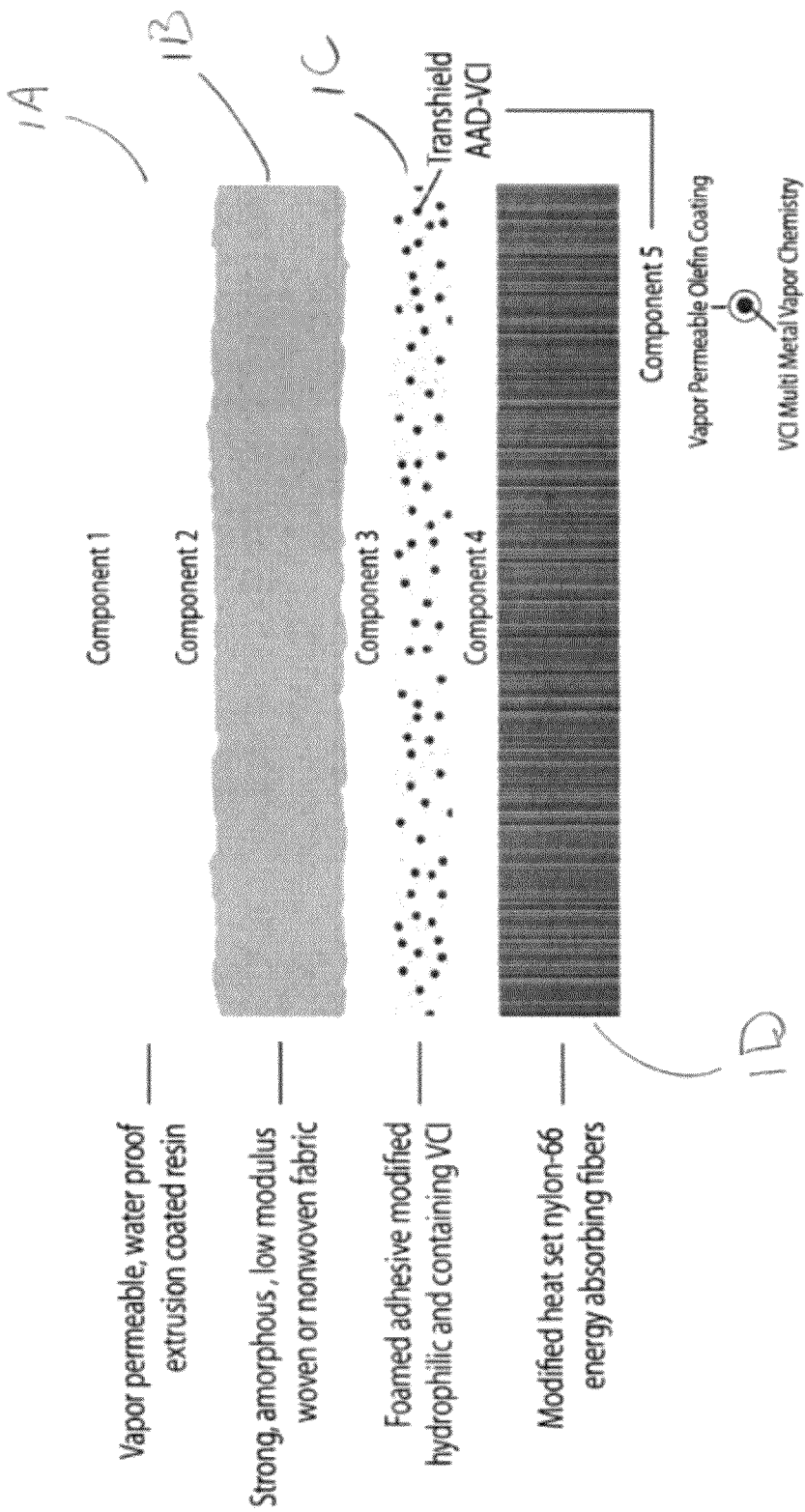
FIG. 2 is a cross sectional view of a construct of the invention, FIG. 2a showing separated components and FIG. 2b showing the integration of different layers with each other.

FIG. 2a shows an expanded cross-section of a fabric construct of the invention showing the individual layers prior to combining them into the construct. Thus, FIG. 2a illustrates the vapor permeable polymeric composition 1A, the porous fabric 1B, the adhesive layer 1C, and the flocked fiber layer 1D. Although the invention is not to be thereby limited, FIG. 2a also shows, in illustrative fashion, one example of the relative thicknesses of each of the layers.

Figure 2B:
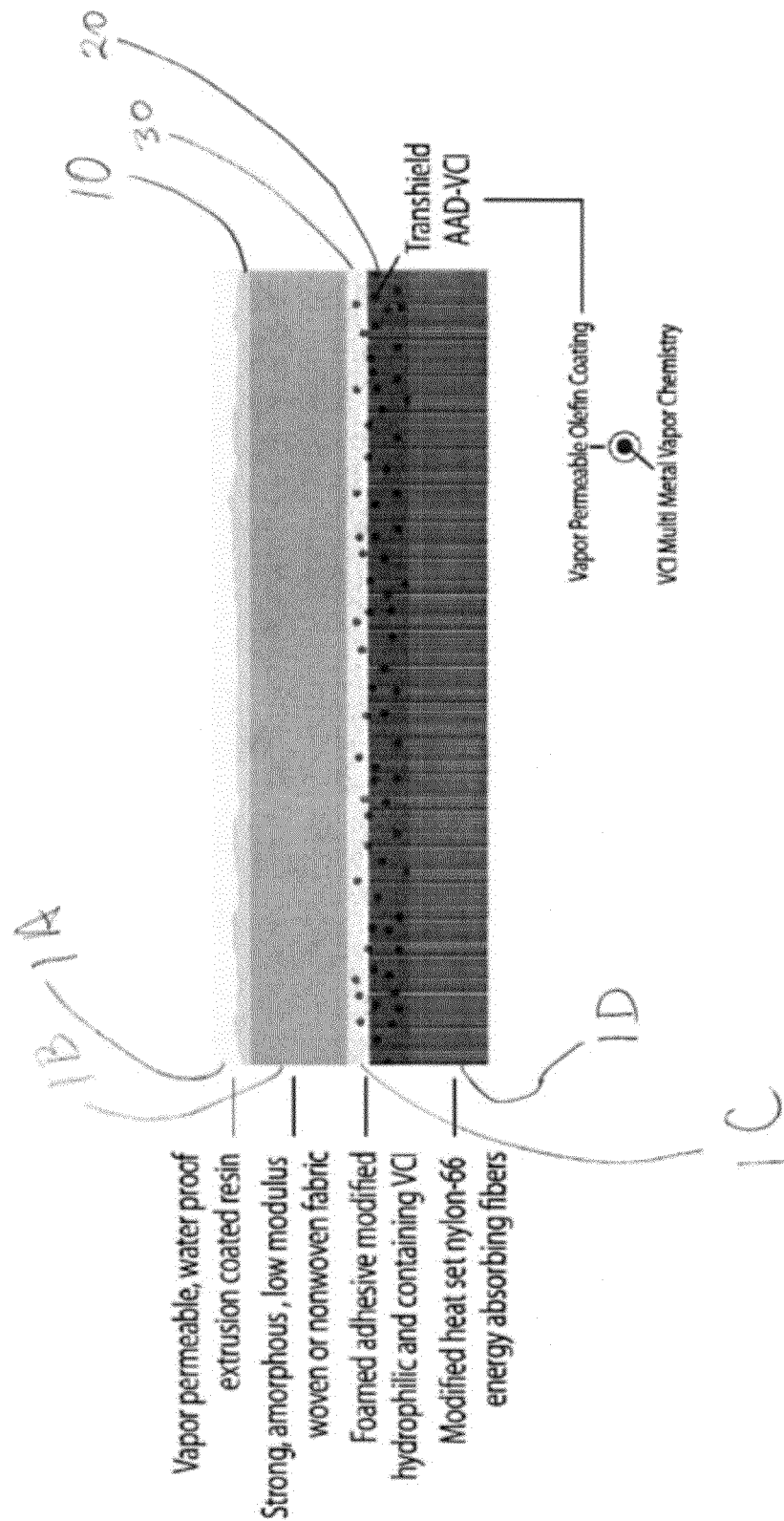

FIG. 2b shows a cross-section of a construct of the invention wherein the layers 1A, 1B, 1C, and 1D are combined into the construct. Thus, the vapor permeable polymeric composition 1A, the porous fabric 1B, the adhesive 1C, and the flocked fibers 1D are shown in cross-section in FIG. 2b. FIG. 2b also illustrates that the thickness of the construct is less than the additive thicknesses of the individual layers. This is seen in FIG. 2b, for example, in the illustrated "overlap" of the polymeric composition 1A and the porous fabric 1B, shown as element 10. Further, the adhesive 1C and a flocked fiber layer 1D are shown to "overlap" at region 20 of FIG. 2b. Finally, the adhesive and the porous fabric are shown to "overlap" at region 30 of FIG. 2b. The structure of the construct shown in FIG. 2b is the result of the manufacturing steps that are carried out as described herein. In a preferred embodiment, a porous fabric 1B is coated with an adhesive 1C and flocked fibers 1D are added. The flocked porous fiber then undergoes a coating step, such as by extrusion coating to apply the vapor permeable polymeric composition 1A.

In one aspect, the fabric construct of the present invention is useful for advanced packaging operations. A packaging defines a volume for containing a product. The invention provides a method of packaging an object where the flocked side of the construct is facing the object to be protected, allowing the flocked-fibers to create a soft surface where they will not damage the surface of the object being protected. Yet, this soft surface is resistant to abrasion, so that it can be placed over objects that have very rough surfaces, such as armored vehicles.

As will be described in greater detail below, the material of the structure and/or size of the flocked-fibers pull moisture, such as condensation, away from the surface of the object covered by the fabric construct or packaging formed therefrom. As the water is pulled by capillary action away from the surface, the cured adhesive composition will provide sufficient polarity and/or hydrophilicity by use of hydrophilic titanates or zirconates, by way of non-limiting example, to attract water molecules. As the water molecules are attracted towards the hydrophilic adhesive layer, a micro environment is created within the cover layers where water molecules are concentrated within the foamed adhesive where the relative humidity is at high levels. As the water moves away from the surface and through the porous fabric in the middle of the construct, the vapor permeable polymer layer on the opposing side of the flocked-fibers will allow the water vapor to pass though. In this way, the water inside the packaging will be attracted towards the outside which has a lower percent relative humidity than the interior micro environment of the packaging. Furthermore the porous fabric, either woven or non-woven or a combination thereof, will allow the breathable (i.e. vapor permeable) polymer coating to penetrate well into the fabric during the calendaring process which results in an application sufficient to pull water away from the object being protected. As shall be understood by those skilled in the art, permeation rates are affected by temperature, humidity and pressure. According to a common rule of thumb, permeability increases by 30% to 50% for every 5 degrees Celsius rise in temperature (Massey, 2003).

The permeability or transmission rate of gasses and vapors through the polymeric material is dependent upon two factors; the solubility of a gas or vapor and the rate of diffusion though the polymer matrix. The solubility function is dependent upon the chemical relationship between the permeant molecule and the polymer; and the rate of diffusion is dependent up on the size of the permeant molecule and the amorphous configuration of the barrier polymer.

In another aspect, the adhesive used in the fabric construct carries vapor corrosion inhibitors, allowing the fabric composition to be used as a corrosion preventative cover. Use of vapor corrosion inhibitors is generally discussed in patents U.S. Pat. No. 5,736,231 (Todt G. L., 1998); U.S. Pat. No. 5,705,566 (Todt G. L., Adhesive With Additive Delivery System, 1998); WO 2010/022066 A2 (Todt & Ozol, Water Vapor Permeable Shrinkable Fabric, 2010); PCT/US09/044686 (Todt & Ozol, Adhesive Composition and Method, 2010), all of which are hereby incorporated by reference. Suitable vapor corrosion inhibitors are disclosed in the referenced patents and further below.

Figure 3:
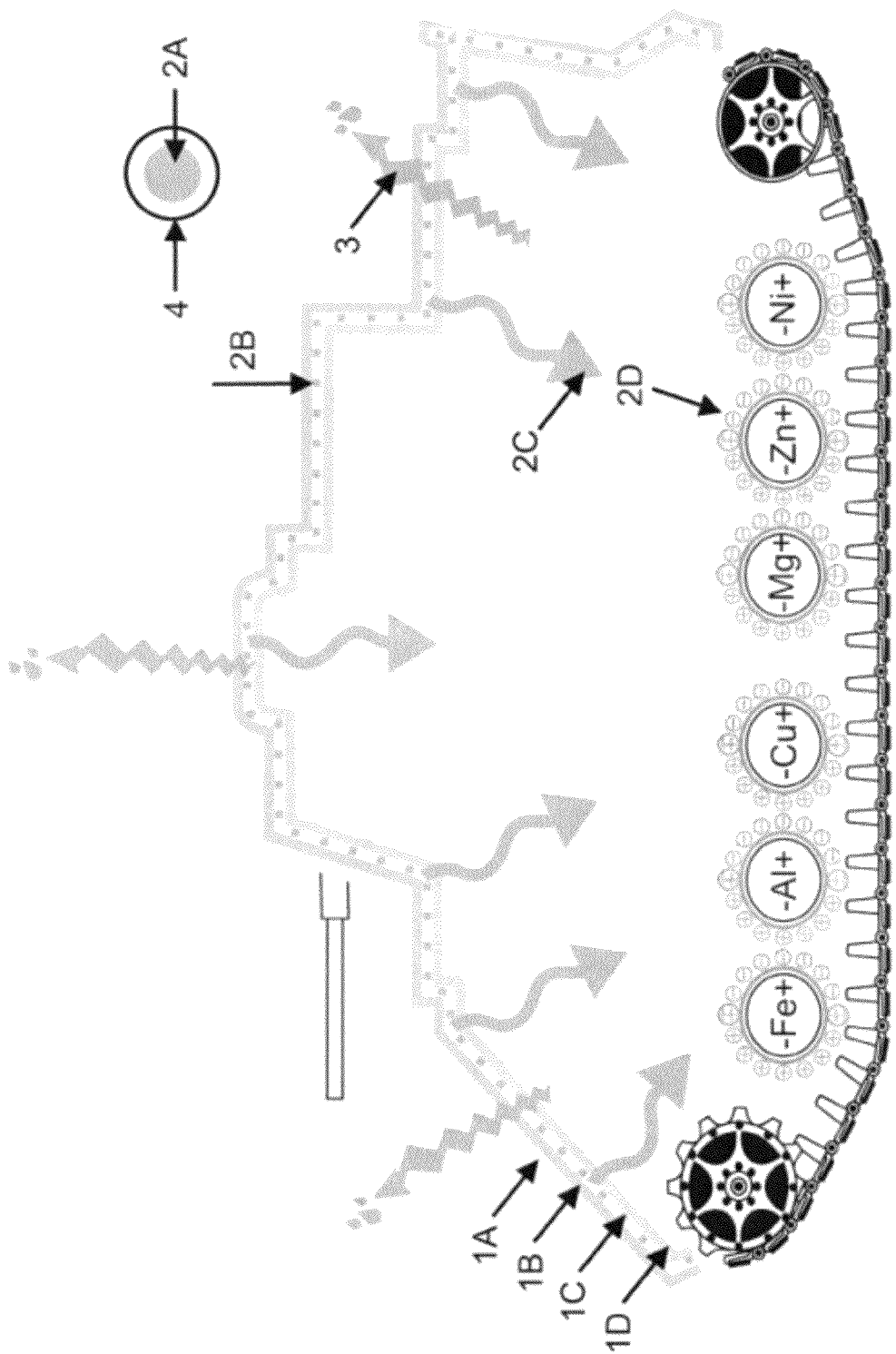
FIG. 3 is a demonstrative view showing the fabric construct applied to an object that is prone to corrosion.

Referring to FIG. 3, a general discussion as to the fabric construct of FIG. 1 in a packaging form, e.g., cover, is also provided. Water vapor (3) is removed from the inside of a cover with the assistance of vapor corrosion inhibitors (2A, 2B,2C,2D). As will now be described, the vapor corrosion inhibitors work essentially in phases throughout the moisture removal process. (2A) represents the corrosion inhibitor in its initial format. The corrosion inhibitors can be encapsulated (4) before application in order to prevent loss of VCI vapor (2C). (2B) represents the corrosion inhibitors inside an adhesive layer. (2C) represents the volatile corrosion inhibitor after it is volatilized from the adhesive into the package/cover; (2D) represents the corrosion inhibitor as it is condensed onto a metal surface to prevent corrosion on the object contained therein.

In a preferred embodiment, the fabric constructs of the present invention show a pattern, such as military digital camouflage. One way of doing this is to mark a pattern on the porous fabric before the flocking operation is carried out on the side of the fabric opposite the marking. One method of marking is to carry out a fabric printing step. Alternatively, a patterned fabric can be provided with conventional weaving techniques. Either way, the patterned fabric is first subjected to a flocking operation to place flocked fibers on a side of the fabric opposite the desired print pattern. Then an extrusion coating process is used to apply a breathable film coating on the print side opposite the flocking. In an embodiment, the breathable film coating is a clear coating that allows the marking, pattern, or print to show on the fabric construct opposite of the flocked side. Another way of providing constructs showing a pattern is to coat the fabric with a breathable polymer before any marking, printing, or flocking step. Then, the fabric side containing the permeable polymer composition is treated and printed, or the polymer coating can have color added in the form of a master batch.

With the above teachings in mind, additional information regarding the various materials and compositions employed in forming the fabric constructs of the present invention, and ultimately packaging formed therefrom will now be described.

Polymeric Coating

The fabric constructs of FIGS. 1-3 utilize a polymeric coating on one side of a porous fabric. The polymeric coating provides good adhesion to the porous fabric and is breathable. By "breathable", it is meant that the polymeric coating is impermeable to liquids (and especially in many applications to liquid water) but is permeable to water vapor. If the breathable coating is impermeable to liquid water, it is called a "waterproof" coating. The film thus acts as a water barrier but allows vapor, such as water vapor, to pass through. Under preferred embodiments, the fabric constructs have a water vapor transmission rate (WVTR) of at least 100 grams/sq meter/day at 37.8° C. (100.04 F.) or at least 120 grams/sq meter/day at 37.8° C.

The fabric construct can be coated before or after the flocking and printing operations. However the most desired application is to coat the porous fabric that has flocked fibers on the opposing side and that is printed on the same side as the coating. It has been surprisingly found that extrusion coating can be used to coat a vapor permeable polymeric composition onto a flocked fabric.

Suitable polymers for the vapor permeable film are commercially available. Polymers that allow high water vapor transmission rates as listed on Permeability Properties of Plastics and Elastomers by L. K. Massey include polyether amide and polyether ester with 300 to 1,000 and 200 to 900 grams of water per millimeter/square meter per day are provided as examples.

Commercial polyether amide resins are available through Arkema under the trade name PEBAX®. PEBAX® is a polyether block amide, also called a polyamide/polyether block copolymer with high physical properties, allowing the coating to be waterproof, yet provide high water vapor permeability. Examples of suitable resins from Arkema include MX 1205 SA 01; MV 1041 SA 01; MV 3000 SA 01; and MV 1074. These resins can be combined with UV stabilizers to provide a coated breathable surface for the fabric composite.

Another class of suitable polymers for forming the vapor permeable film is the fatty acid modified ionomers (FAMI) of Dupont™. These are polymers containing a plurality of carboxyl groups in their backbone, formulated with fatty acid salts. In various embodiments, the carboxyl groups of the polymer and fatty acid are partially neutralized with sodium (FAMI-Na) or with potassium (FAMI-K).

The fatty acid modified ionomers contain one or more E/X/Y copolymers and one or more organic acids or salts thereof with a fraction of carboxylate groups being modified or neutralized with an alkali metal. The ionomers are typically combined with other polymers to provide suitable vapor permeable polymeric compositions. A description of suitable ionomers and of vapor permeable polymeric compositions containing the ionomers can be found in U.S. Publications 2007/0287019 A1 and 2007/0283652 A1 which are hereby incorporated by reference.

An example of a breathable polymer resins is DuPont™ Entira™ Smart, marketed as product number AD1119. This resin provides up to 4,000 grams of water per mil/per square meter; per day at 100% RH and 37.8° C. test temperature. A more preferred resin to use in the polymer composition of the present invention is DuPont™ Entira™ Breathe, with product number AD1099. This resin can provide water vapor transmission rates at one mil of up to 12,000 grams per square meter; per day with the same test setting.

As noted in the foregoing application(s) the disclosed breathable polymers were intended for lamination to various fabrics. However, it has now been determined that these compositions are suitable for extrusion coating onto flocked fabrics in processes of the present invention. Unlike a lamination process, an extrusion coating process allows the coating to be embedded into the fabric, allowing the thickness of the fabric constructs to be reduced. Blends of water vapor permeable resins which are suitable for extrusion coating are also described in U.S. patent application Ser. No. 12/762,818 (Chen, 2010) and Ser. No. 12/762,919 (Chen, Method For Preparing A Selectively Permeable Protective Structure, 2010), the disclosures of which are hereby incorporated by reference. The extrusion coated layer can either be a monolayer application or a co-extruded application with two or more layers.

A non-limiting example of a polymer blend that can be used as a coating is a blend of DuPont™ Elvaloy®AC 1224—50% by weight of polymers; DuPont™ Entira™ Breathe—40% by weight of polymers; DuPont™ Fusabond® FB556—10% by weight of polymers primary. The composition blend will support the inclusion a weathering package, such as one containing one or more additives selected from primary and secondary antioxidants, UV stabilizers and hindered amine light stabilizers by way of non-limiting example. Suitable additives for the weathering package include Tinuvin 328, Tinuvin 770, Chimassorb 944 and Irganox 100 from BASF (Formerly Ciba Specialty Chemicals). Preferred loading of the weathering package is preferred to be 1% or less of the total polymer by weight. Possible loading combinations can be seen in the table. These packages will protect the polymer structure in processing and outdoor weathering during its use.

TABLE 1

Exemplary stabilizer recipes for the polymeric coating.

| | | Preferred Range | | | |
|---|---|---|---|---|---|
| | Property | % in Film | ppm | % in Film | ppm |
| Package #1 | | | | | |
| Tinuvin 770 | HALS-Low Molecular Weight | 0.20% | 2000 | 0.30% | 3000 |
| Chimassorb 944 | HALS-High Molecular Weight | 0.10% | 1000 | 0.20% | 2000 |
| Tinuvin 328 | High Performance UVA | 0.20% | 2000 | 0.40% | 4000 |
| Irganox 1010 | Thermal Stability | 0.10% | 1000 | 0.10% | 1000 |
| TOTAL | | 0.60% | 6000 | 1.00% | 10000 |
| Package 2 | | | | | |
| Tinuvin 770 | HALS-Low Molecular Weight | 0.00% | 0 | 0.00% | 0 |
| Chimassorb 944 | HALS-High Molecular Weight | 0.25% | 2500 | 0.40% | 4000 |
| Tinuvin 328 | High Performance UVA | 0.25% | 2500 | 0.40% | 4000 |
| Irganox 1010 | Thermal Stability | 0.10% | 1000 | 0.20% | 2000 |
| | | 0.60% | 6000 | 1.00% | 10000 |

If desired, the vapor permeable polymeric layer of the fabric composition can be further enhanced by use of other additives including antimicrobials, colorants, coupling agents, flame retardants, mold release agents and antistats, among others.

Because the unique properties of the above described resin blends, additive packages can be limited to no more than 1%. In order to improve the anti-static properties of the fabric constructs described herein, the coating blends can be further modified as described by European Patent EP1 569 794 B1 (Chen, 2005). Rendering the fabric constructs anti-static in nature will allow for its use in certain highly regulated industries such as the aviation industry, where static electricity regulations are heavily applied in regards to airplane fueling/de-fueling. In aviation industry plastic containers are not to be used for into-aircraft refueling or defueling as the static electricity charge potential is sufficient to cause a spark with potential explosive results.

Extrusion Coating

Surprisingly, it has been found that vapor permeable coatings can be applied by extrusion coating the permeable polymer compositions onto a porous fabric that contains flocked fibers on one side. Advantageously, the constructs are characterized by an adhesion peel strength in the preferable range of 500 g/in and higher. In various embodiments, the peel strength is 600 g/in or higher, 750 g/in or higher, 800 g/in or higher, 900 g/in or higher, or 1000 g/in or higher. Relatively high peel strengths are required of the construct when used in challenging conditions characterized by high and low temperatures, high and low humidity, high UV, and rough handling typical of contemplated military uses.

For conventional polyolefins, it is known that the modulus changes greatly with temperatures, it being typical to see differences of up to 600% from low temperature extremes to high temperatures. Under these conditions, coatings with low bond strength tend to delaminate, especially when subjected to temperature extremes of −30° C. to 60° C. and/or subject to rough and frequent handling. Not only must the bond strength be sufficient to survive the six fold variance in modulus during use, it also must resist delamination caused by water vapor penetrating between the fabric and coating. For these reasons, high bond strengths are required.

To the extent that the fabric constructs of the present invention are extrusion coated, it is contemplated that coatings in the range of 0.5 to 10 mils can be employed. A range of 3 mils to 7 mils is preferred in some embodiments to balance the water vapor transmission rate and the stiffness of the whole structure. As the polymer coating thickness gets higher the "hand" or the softness of the fabric increases and the water vapor transmission rates go down.

The extrusion process can be set up in various methods. The polymer blend can be pre-compounded with all resins and additives or they can be blended at the time of extrusion coating as should be understood in the art of extrusion coatings.

Porous Fabric:

One objective of the porous fabric is to provide a strong core for the fabric constructs. A high strength to weight ratio is desirable because as the objects being covered get larger the covers designed to go over these objects get heavier and they require more man power and time for placement and removal. Therefore a light weight fabric is more desirable. Also packaging such as covers made from the fabric constructs of the present invention need to have enough physical strength to provide sufficient protection from the environmental hazards. Military vehicles, navy equipment on board ships and some industrial equipment are often used, transported or stored under undesirable weather conditions such as hail storms, high wind storms or hurricanes. Due to these conditions the fabric composite must be able to withstand tearing or ripping. If any tear or ripping takes place, preferably the fabric construct will be designed so as to limit their spread.

The fabric constructs of the present invention utilize a woven, a nonwoven or a combination of woven and nonwoven aspects to give rise to the so called core layer. As a non-limiting example, materials suitable for the core layer may be made of organic fibers such as cotton or hemp, or made of synthetic fibers such as Nylon 6, Polyester, or glass fibers. The core fabric layer may also be a blend of an organic and a synthetic fiber as well. A non-limiting example of a woven fabric that may be used as the porous fabric layer is a textured polyester fabric named 380 Greige Fabric available through Milliken Company. This fabric has a basis weight of 4.5 ounces/square yard and has a tensile strength of 261×205 lbs (Warp×Filling). In order to improve physical properties the woven fabric may incorporate "rip stop"; which is a special reinforcing technique that makes a fabric resistant against tearing and ripping. This technique involves reinforcement threads that are interwoven typically 0.2 to 0.3 inches apart and creates a better weight to strength ratio where small tears and rips are less likely to spread. Threads employed for the rip-stop can either by a Nylon 6,6 or a PET fiber, by way of non-limiting example.

A non-limiting example of a commercially available non-woven material suitable for use as the porous fabric core is the Komanda® product by Norafin. Komanda® products can have various basis weights, for example from 185 gsm-210 gsm and may have varying ratios of cotton-to-polyester with an integrated polyamide or PET scrim in the center of it.

Regardless of the material(s) employed for the porous fabric layer, otherwise referred to herein as the core layer, it is preferable that the materials be drapeable, flexible, and be able to hold print. Furthermore the porous fabric needs to provide physical properties such as Tensile Strength and Tear Strength in order to create a strong fabric construct.

Adhesives:

In general, flocking involves a substrate, an adhesive and flock grade—short cut-fibers. U.S. Pat. No. 2,675,330 (Schwartz, 1946) and U.S. Pat. No. 4,459,332 (Giglia & Rye, 1984) provide some initial background on flock processing and application information.

According to the teachings of the present invention the porous fabric serves as an appropriate substrate.

The adhesive is the glue that holds the flock fibers to the substrate. This could be an all solids, solvent based or water based adhesive. Non-limiting examples for suitable adhesives are acrylic latex, urethanes and epoxies. The adhesive can be used either straight or foamed. A preferred adhesive for this invention is water based acrylic latex adhesive that can be foamed. A closed cell foamed adhesive with air pockets has been shown in experimentation associated with the present invention to improve the overall breathability of the fabric construct. A non limiting example for a suitable adhesive is 3822 from Key Polymer in Lawrence, Mass. It is also preferred that the adhesive is further modified to incorporate a titanate or a zirconate coupling agent in order to render the adhesive more hydrophilic, where the water molecules would be attracted towards the adhesive as they are being pulled by the capillary action of the flocked fibers. Preferred types of titanates and zirconates are available from Kenrich Petrochemicals as LICA 38J and KR 44. A suitable loading calculation for the titanates is at about 1% of the polymer content plus 0.8% of the solid content in the adhesive. The adhesive is preferred to be further modified to carry a vapor corrosion inhibitor (VCI) package that is designed to be used in a water based system. The corrosion inhibitors should be designed in a fashion that they have "multi-metal" corrosion preventative chemistries. In a preferred embodiment, the VCI package is a multicomponent, multimetal package that contains no nitrites or nitrates. An example of a multi-metal corrosion inhibitor package is VCI Powder TS 1335 from Desi Kimya in Istanbul, Turkey. Since the adhesive is preferably in foamed format, the air pockets in the adhesive allow the VCI to volatilize. Furthermore the flock fibers create more air between the metal surface and the VCI molecules allowing the VCI to condensate over the metal. The condensation of VCI's allows a better, more uniform coverage of the metal surface, creating effective corrosion prevention. In a preferred embodiment the adhesive will have between 1% and 10% "active" VCI chemistry. The VCI chemistry is more active with the high moisture content. Since the adhesive is preferably a hydrophilic rendered latex adhesive, the moisture captured in the air pockets of the foamed adhesive will improve the effect of VCI chemistry on the covered object. The flocking operation, as will be described in greater detail below, requires heat setting and drying at high temperatures. Some vapor corrosion inhibitors can be heat sensitive by nature. In order to prevent loss of VCI or degradation of these chemistries the vapor corrosion inhibitors can be encapsulated by protective wax polymers such as polypropylene or polyethylene as is known in the art. Encapsulation of the VCI's is particularly important when the breathable polymers are applied via extrusion as will be described in greater detail below.

It is important that the adhesive remain flexible in cold weather environments. A nonflexible adhesive application, one that has a high glass transition temperature, would turn rigid, thus covers made from the fabric constructs would lose drape-ability.

The overall average thickness of the adhesive layer, including the pre-coat or the top coat combined, ranges from about 0.02 mils to about 4 mils depending on the intended application. The fibers anchor into the adhesive from 10% of its length to 50% of its length.

Flocking

Flock fibers can be randomly cut or precision cut and can range in length from 0.25 mm to 25 mm, from 0.25 to 23 mm, from 0.25 mm (about 9-10 mils) to about 20 mm (about 760 mils), from 0.25 mm to 10 mm, or from 0.25 mm to 5 mm. They can be in any shape, such as round, trilobal, and dogbone, for example. Flock fibers can be synthetic or organic; non-limiting examples of common flock fibers are nylon, polyester, rayon, acrylic, cotton, and the like. The fibers can be from 0.5 to 90 denier. The fibers anchor into the adhesive from 10% of its length to 50% of its length; 10% is more preferred for this application. The flock fibers create a soft-to-touch surface, yet are able to withstand degradation caused by wear against surface contact over time. By design the flock fibers will not damage painted surfaces.

Preferably, the flock fibers employed will help wick water or other solvents away from the surface being protected, by use of capillary action. The water gets pulled away from the surface of the article over which the fiber construct is employed by the flock fibers. Water or other solvents pass through the flock fibers and they are pulled towards the hydrophilic adhesive coating, acting as a bladder. From there the porous fabric or nonwoven helps to push water from the foam adhesive to a lower moisture content polymeric coating. Working in synergy all the parts act as a gradient force to keep water away from the surface of the object to allow further corrosion prevention.

Flocking the porous fabric layer involves several steps. The substrate gets coated with an adhesive at desired coating levels; then flock fibers are embedded in the adhesive by use electrostatic and mechanical forces. The electrostatic force field aligns the flock fibers substantially perpendicular to the surface of the fabric layer. The adhesive is then cured with heat or by other means—UV, electro-beam etc.

The adhesive coating methods on the substrate can utilize a variety of methods including knife coating, curtain coating, reverse roll coating, gravure coating and rotary screen coating, by way of non-limiting example.

Having a flock on at least one side of the porous fabric allows the finished cover to drag across rough surfaces without snagging the fabric or sacrificing any fibers. If loose fibers such as nonwoven fibers were used instead of flock fibers, the rough surface of the object being protected such as the tank shown in FIG. 3 would snag the loose fibers and the fibers would sacrifice themselves as the fabric construct is being pulled across that surface. The flock fibers allow the fabric construct to "glide" over rough surfaces with limited sacrifice of the fibers and/or tearing or ripping of the fabric construct as its being pulled over a rough surface. The fibers dissipate the energy from the movement when the cover moves on the surface.

The flock fibers are preferably heat set, where the flock fiber is heated to its crystalline state and formed into a certain shape. This gives the fiber a memory and the return to the ideal orientation. This helps prevent the fiber from being crushed during the extrusion process when the breathable polymer is coated on the fabric. It also allows faster recovery of the orientation after the cover is folded up.

The orientation of the fibers, electro-statically and/or mechanically, in a substantially perpendicular manner to the substrate also helps with moisture removal process from the surface. The fibers help to wick water away from the surface being protected, as they act as straws to pull water towards the cover. As the water moves towards the adhesive, it is pulled further out; working in conjunction with the breathable coating.

2-Stage Nonwoven Construct

Figure 4:
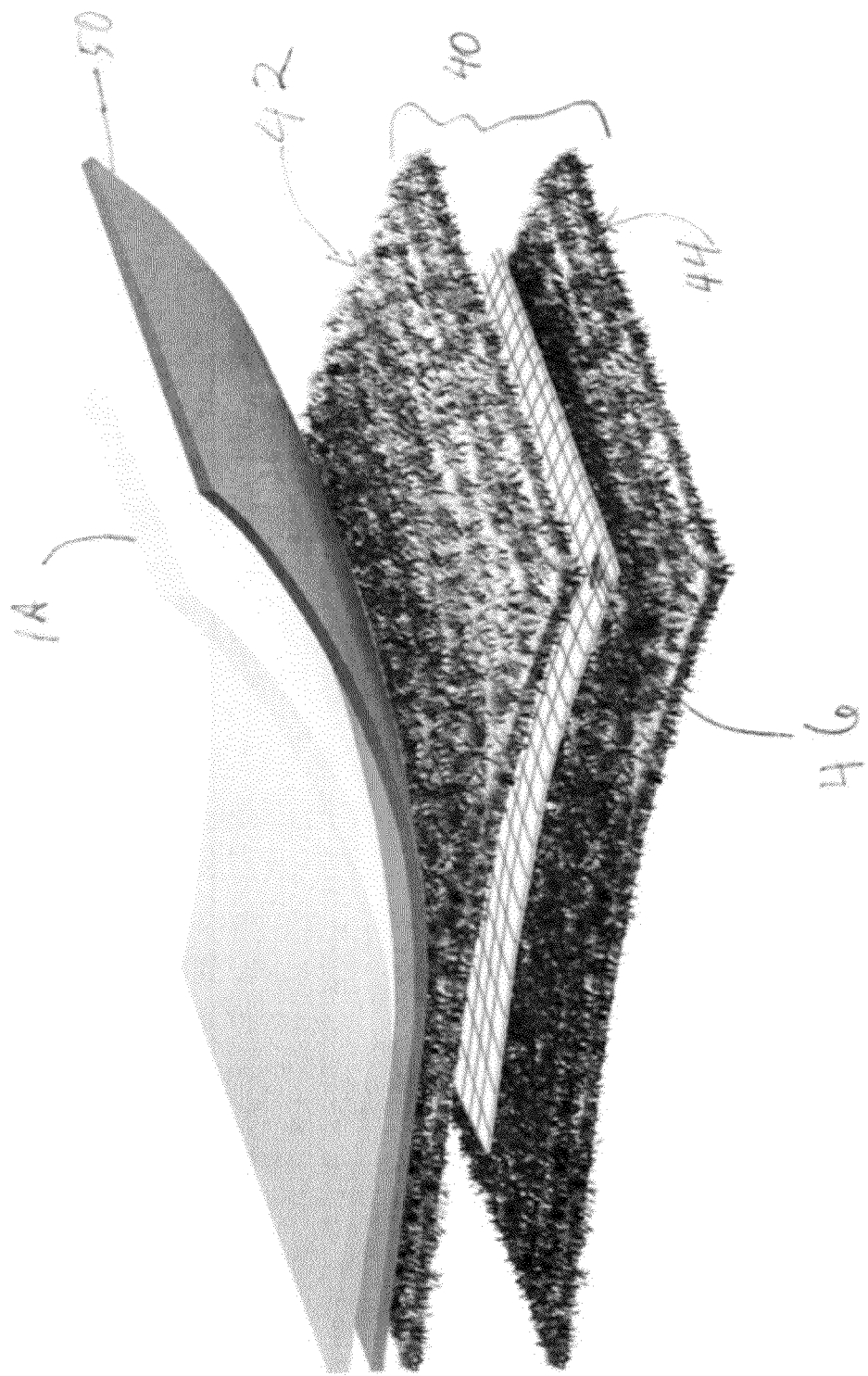
FIG. 4 is a partially separated perspective view showing the different layers of an alternative fabric construct according to the present invention.

An alternative embodiment of a fabric construct according to the teachings of the present invention is shown in FIG. 4. This fabric construct is made up of a vapor permeable waterproof polymeric coating 1A like that of FIG. 1. This polymer is coated on to a "stitch-knit" nonwoven structure 40 that is optionally already printed. Preferably the "stitch-knit" nonwoven 40 is coated with a VCI composition 50 prior to coating as shown in FIG. 4. The stitch knit nonwoven 40 is made of a layer 44 of first fibers having a smaller denier and lower hydrophilicity than the fibers in a second layer 42. A stitch knit fabric or scrim 46 is provided in the nonwoven 40 between the first layer 44 and second layer 42. Detailed explanation of the fabric construct will now be provided.

A special non-woven fabric is provided that is coated (by co-extrusion or by lamination, by way of non-limiting example) with a vapor permeable breathable film. In one version of the fabric construct, there is no adhesive and no flocking. Strength is provided by the special structure of the non-woven.

In one embodiment, the special non-woven is a strong entangled non-woven containing a stitch knit fabric as a reinforcement. The non-woven is further characterized by at least two layers of fibers having different hydrophilic and hydrophobic characteristics. The two layers of fibers are constructed around a stitch knit fiber with subsequent treatment such as by hydro-entanglement or needle punch methods by non-limiting example.

To illustrate, the non-woven can be made by first carding a fiber of relatively low denier. After the first layer is carded, a stitch knit fabric is placed on top of the card. For purposes of the current description, a stitch knit fabric is characterized by a woven structure that is open or is characterized as a "loose" stitch, such that the distance between the threads of the weave is great enough to give the appearance of a netting rather than that of a closed knit fabric. For example, the distance between threads in the stitch knit fabric is about 0.5 to about 20 mm or about 1 to 10 mm. A spacing of about one eighth of an inch (about 3-4 mm) has been found to be particularly suitable.

After providing the stitch knit fabric in this way, a second card of fibers is then laid down on top of the stitch knit fabric followed by an entanglement process such as hydro-entangling or needle punching. The second card consists of higher denier fibers than the first card. The smaller fibers of the first card tend to wick water and vapor quickly and are suitable for use on the side of the construct which in packaging use will face the surface of the object to be protected. Its wicking properties will act to quickly absorb vapor from the packaging volume. The second card in turn is disposed in use farther from the packaging volume but is physically connected to the first card of lower denier fibers. The larger fibers of the second card are more hydrophilic than the smaller fibers of the first card, and so are capable of taking the water vapor wicked by the first card and delivering it to a vapor permeable film applied to the second card side of the non-woven to form the construct of this embodiment.

Although making the special non-woven has been illustrated by laying down a first card of smaller denier fibers, it is to be understood it can just as well be made by carding the higher denier fibers first, followed by interposing a reinforcing knit fabric and subsequent carding of the smaller denier fibers followed by entangling. Whichever way the non-woven fabric is made, in use the lower denier fibers face the volume or part to be protected, as described further herein.

The non-woven is thus an entangled fabric made of layers of two different hydrophobicities (or equivalently of two different hydrophilicities), the whole thing being reinforced, for example by a stitch knit fabric, to provide strength. The material of the fibers and the stitch knit fabric is chosen so that the non-woven will have suitable strength and softness and so that the fibers can withstand the temperature of subsequent operations such as lamination or co-extrusion of the breathable polymer composition onto the non-woven.

Suitable fibers for the first and second card include polyester and nylon. Blends of fibers can be used, as well as combinations of natural and man-made fibers, as long as they maintain suitable properties at all times under the conditions of manufacture and use. The first card side of the non-woven, which in use faces the object to be protected, is advantageously soft because of the small denier fibers. Example polyester staple fibers that can be used in this application include Dacron®Plus, HydroPur Fiber, Delcron® Hydrotec Fiber and SteriPur® AM fibers from DAK Americas company. In order to provide a soft-to-touch surface it is preferred that the fibers used in this application are less than 10 deniers, and more preferably less than 2 deniers.

Likewise, the stitch-knit fabric contains threads and fibers made out of materials that can withstand all of the process steps. Suitable fibers include those of the first and second cards.

As noted, the fibers of the second card are more hydrophilic than those of the first card by virtue of their larger size. Advantageously, this enables the non-woven to transmit the vapor wicked by the first card through the second card and deliver it to the breathable film that is applied to the non-woven on the side of the second card. If desired, a difference in hydrophobicity/hydrophilicity can be achieved by providing a second card having fibers with additives that increase the hydrophilicity. An example of a suitable additive is the hydrophilic titanates discussed elsewhere for use in the adhesives of other embodiments of the construct.

So, the special non-woven is characterized by a first layer of fibers having a first hydrophilicity in contact with a second layer of fibers having a second hydrophilicity. In one embodiment, the structure is further characterized by a stitch knit fabric disposed between the first and second card fibers, providing reinforcement. The first and second fiber layers are in contact with one another by virtue of the fact that the fabric precursor made up of the card of the first fibers, the stitch knit fabric, and the card of the second fibers is subjected to an entanglement process such as hydro-entangling. In this way, the fibers of the first card and of the second card are entangled around each other and around the stitch knit fabric. The entangled non-woven is then coated, on the side containing predominantly the second card fibers (i.e. the side with fibers of greater hydrophilicity), with a breathable, vapor permeable polymer composition. In use, the construct just described is applied with the non-woven facing the object to be protected, and more specifically the first card side with the smaller fibers facing the object to be protected.

In another embodiment, a two-stage non-woven is provided as above by carding a first layer of fibers, followed by carding a second layer, where the fibers of the two cards differ in hydrophobic of hydrophilic character. Instead of having a stitch knit fiber interposed between the cards as above, in an alternative embodiment the two cards can be lightly stitched, either before or after entangling. The two-stage non-woven is then provided with a vapor permeable polymeric film composition, as described above.

In another embodiment, the two-stage non-woven with reinforcing stitching made as described above is used as the porous fabric in the flocked construct described further herein. In this embodiment the two-stage non-woven can be optionally printed. The fabric can be flocked before or after printing, and the flocked fabric can be provided with a vapor permeable polymer coating such as by laminating or co-extrusion.

Fire Resistant Fabric Constructs

The fabric constructs can be made fire resistant by adding known fire resistant additives to any of the constituent parts to impart a desired measure of protection against or resistance to fire. For example, additives can be added to the porous fabric, to the fibers making up the porous fabric, to the flocked fibers, to the flocking adhesive composition, and to the breathable (water vapor permeable) polymer coating. In this way, a fabric construct can keep a fire from spreading from its protected object and/or can protect the protected contents from a fire on the outside.

Fire retarding (FR) fabrics include those consisting of glass fibers (fiberglass) or other inorganic fibers (silica fibers, asbestos, and the like). Constructs containing organic and other flammable fabric can be rendered fire resistant or retardant by the use of intumescent adhesives such as acrylic, epoxy, melamine, or urethane intumescent coatings either in addition to, or as replacements for other adhesives such as those used to laminate a vapor permeable polymeric coating or to incorporate flocked fibers into the construct.

If desired, fire resistant flocking fibers such as fiberglass can be used in the fabric constructs described herein.

In a fire, the side of the fabric with the intumescent coating expands to create a char barrier. The char helps to protect against the conductive penetration of hot gasses and flames. It can also absorb smoke into its matrix, thus lowering byproducts from the fire. It reduces the flame spread and helps to slow the fire's progress.

In an embodiment of a construct that keeps a fire from spreading, the fabric can be made of fiberglass and have an acrylic intumescent coating on one side of the fabric. The flocking adhesive can be applied over the intumescent adhesive and then flock can be applied to the flocking adhesive as described herein. The fabric is then coated with the highly breathable polymer on the opposite side from the flocking with a polymer make-up as described in FIG. 1. If fire were to occur inside the material, the flock fibers—facing the surface—and the flock adhesive would burn away and the intumescent coating would expand and form a char barrier, preventing the fire from escaping. The fiberglass fabric would help prevent the fire from breaking through and would not readily burn. It would also provide a refractory surface that helps prevent the heat from getting through.

In an embodiment of a construct that keeps a fire on the outside from damaging the protected contents, the porous fabric can be a fiberglass fabric and have an acrylic intumescent coating on one side of the fabric. Here, the flocking adhesive would on the fabric side opposite the intumescent and the flock would be applied into the flocking adhesive. The vapor permeable polymeric coating would be applied on the fabric side opposite the flocking, as usual. In use a cover made from the fabric construct would have the flocked fiber on the inside. In case of a fire on the outside, the intumescent coating would expand and form a char barrier preventing the fire from entering the cover. The fiberglass fabric would help prevent the fire from breaking through and would not readily burn. It would also provide a refractory surface that helps prevent the heat from getting through.

Example 1

Flocking a Porous Fabric

In a non-limiting example, a fabric construct is prepared as outlined here. The flocking fibers are 1.8 denier round semi-dull nylon 6,6 flock fiber that is 1 mm (39.37 mils) in length. The fiber density upon flocking in an illustrative embodiment is about 61 gsm (1.8 oz/sq yard or 0.1125 lbs/sq yard). The flocking operation as it takes place at Spectro Coating Corporation in Leominster, Mass. starts with a fabric—woven or nonwoven—that is preferably printed on one side. An adhesive pre-coat is then applied to the fabric on the side opposite the print. The adhesive pre-coat most preferably has a blow ratio of 5:1. The pre-coat add on rate most preferably is about 0.5 oz/sq yard (0.031 oz/sq yard or 16.95 gsm). Following the application the pre-coat gets dried at 280° F. Upon drying the pre-coating seals the fabric on the applied side and acts as a primer between the fabric and the top coat adhesive. The topcoat is applied on the same side as the pre-coat. The adhesive is foamed at a ratio of 1.60:1.00 and it is approximately 4 mils thick; with an add on rate of 3.20 oz/sq yard (0.2 lbs/sq yard or 108.50 gsm). After the top coat adhesive is applied, the fabric goes into the "flock chamber". Here the fabric is mechanically moved in an "up & down" format as it moves through the flock chamber. At the same time pre-cut flocking fibers are dropped into the "flock chamber" from hoppers. There are electrically charged metal bars placed across the width of the web. These charged metal bars constantly alternate the charge to align the fibers perpendicular to the moving fabric. The current flow on the metal bars is regulated by providing a voltage between 10,000 volts and 120,000 volts AC or DC.

As the fabric is mechanically moved up & down the fibers are pushed into the adhesive and they are stuck perpendicularly to the adhesive. Following the flocking process the fabric enters a drying oven where the adhesive is cured to set in place. At this stage the topcoat is dried at 250° F. and then cured and cross-linked at 320° F. The flock fibers are anchored into the adhesive to at least 10% of their overall length or in this case at about 0.10 mm (3.94 mils) deep. The flocking fibers are heat set at 405° F. During such application the adhesive pre-coat, adhesive top coat or both layers, may have Vapor corrosion inhibitors. The preferred VCI add on rate in the top coat adhesive is about 2% by weight. In this example there would be about 2.17 grams of active VCI chemistry and about 1% by weight titanate or zirconate coupling agents that renders the adhesive more hydrophilic.

The thickness of the adhesive is ideal for the addition of VCI and titanate to work in synergy with the whole system to remove moisture and provide corrosion inhibitors into the macro environment of the packaging.

Example 2

Coating a Flocked Fabric

The flocked fabric of Example 1 is extrusion coated by a 3 mil thick mono-layer polymer blend that is made up of, by non limiting example, 50% Elvaloy™ AC 1224, 40% Entira™ Breathe and 10% Fusabond™ FB556 by polymer weight, plus a weathering package as within the ranges given Table 1 above.

The extrusion process settings were; melt temperature at 473° F., Chill Roll at 75° F., nip roll at 100 psi, corona treatment at 5 kW and line speed of 75 feet per minute.

We claim:
1. A method of manufacturing substantially waterproof moisture vapor permeable cover material comprising the step of:
   a. providing a hydrophilic fabric layer comprising a non-woven material, or a combination of woven and non-woven materials, including two layers with an inner layer of lower hydrophilicity and an outer layer of greater hydrophilicity;
   b. applying an adhesive to the fabric layer;
   c. applying flocked fibers to the adhesive layer to form an inner side of the cover material designed to contact an item to be covered; and
   d. extrusion coating a substantially waterproof, moisture vapor permeable polymeric top layer to the fabric layer on the side opposite the adhesive and flocked fibers to form an outer side of the cover material configured to be exposed to an external environment, and said moisture vapor permeable polymeric top layer being extruded on said fabric, the outer layer of fabric being adjacent the moisture vapor permeable polymeric top layer.

2. The method of claim 1 wherein said adhesive layer is formed from a water or solvent based adhesive composition selected from one or more of the group consisting of acrylic latexes, urethanes, and epoxies.

3. The method of claim 1 comprising applying said adhesive by spray coating, knife coating, curtain coating, reverse roll coating, gravure coating or rotary screen coating.

4. The method of claim 1 wherein said adhesive layer is formed from an intumescent adhesive composition.

5. The method of claim 2 wherein said adhesive is hydrophilic and contains vapor corrosion inhibitors.

6. The method of claim 2 wherein said adhesive is modified with titanates and/or zirconates.

7. The method of claim 2 wherein said adhesive layer further comprises one or more additives selected from the group consisting of vapor corrosion inhibitors, anti-static agents, antimicrobials and biostatics.

8. The method of claim 1 wherein said adhesive layer is foamed.

9. The method of claim 1 wherein said flocked fibers are electro-statically and mechanically applied to said adhesive.

10. The method of claim 1 wherein said flocked fibers comprise one or more materials selected from rayon, acetate, nylon, polyolefin, acrylic, polyester, carbon fiber, cotton, hemp, and wool.

11. The method of claim 1 wherein said flocked fibers have an average denier of 0.5 to 90 deniers.

12. The method of claim 1 wherein said flocked fibers have an average length between 0.25 mm and 20.0 mm.

13. The method of claim 1 wherein said substantially waterproof, moisture vapor permeable polymer composition comprises a fatty acid modified ionomer at least partially neutralized with potassium ions and/or sodium ions.

14. The fabric construct of claim 1 wherein the moisture vapor permeable polymeric composition comprises a polyamide/polyether block copolymer.

15. The method of claim 1 wherein the moisture vapor permeable polymeric composition comprises a potassium salt of a fatty acid and an ionomer comprising a plurality of carboxylate groups.

16. The method of claim 1 wherein the moisture vapor permeable polymeric composition forms a layer having an average thickness of 0.5 mil to 10 mils.

17. The method of claim 1 wherein the moisture vapor permeable polymeric composition forms a layer having a water vapor transmission rate of at least 100 grams/square meter/day at 37.8° C. and 100% relative humidity.

18. The method of claim 1 further including a woven scrim between said layers of fabric.

19. The method of claim 18 including the step of entangling said layers of fabric with the said scrim.

* * * * *